US008047695B2

(12) United States Patent
Inoue

(10) Patent No.: US 8,047,695 B2

(45) Date of Patent: Nov. 1, 2011

(54) VEHICLE LAMP

(75) Inventor: Takashi Inoue, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 280 days.

(21) Appl. No.: 12/427,483

(22) Filed: Apr. 21, 2009

(65) Prior Publication Data

US 2009/0262550 A1 Oct. 22, 2009

(30) Foreign Application Priority Data

Apr. 22, 2008 (JP) ................................ 2008-111817

(51) Int. Cl.
*B60Q 1/00* (2006.01)

(52) U.S. Cl. ........ 362/547; 362/294; 362/373; 362/543; 362/544; 362/545; 362/546

(58) Field of Classification Search .......... 362/543–547, 362/294, 373

See application file for complete search history.

(56) References Cited

U.S. PATENT DOCUMENTS

| | | | | |
|---|---|---|---|---|
| 6,595,672 | B2 * | 7/2003 | Yamaguchi | 362/547 |
| 2007/0076422 | A1 * | 4/2007 | Nicolai | 362/547 |
| 2007/0091632 | A1 | 4/2007 | Glovatsky et al. | |
| 2009/0316425 | A1 * | 12/2009 | Inoue et al. | 362/547 |

FOREIGN PATENT DOCUMENTS

| | | | |
|---|---|---|---|
| DE | 10 2005 019651 | A1 | 11/2006 |
| EP | 1647766 | A | 4/2006 |
| JP | 2006-286395 | A | 10/2006 |
| WO | 2005-116520 | A | 12/2005 |
| WO | 2005-116522 | A | 12/2005 |

OTHER PUBLICATIONS

Extended European Search Report issued in European Application No. 09158298.1-1268, dated Jul. 1, 2009.

* cited by examiner

*Primary Examiner* — Stephen F Husar
*Assistant Examiner* — Meghan Dunwiddie
(74) *Attorney, Agent, or Firm* — Sughrue Mion, PLLC

(57) ABSTRACT

A vehicle lamp is provided. The vehicle lamp includes semiconductor light emitting device, a heatsink configured to dissipate a heat generated by the semiconductor light emitting device, a fan which moves air, a guide portion configured to diffuse the air from the fan and to guide the air toward the heatsink, and a housing in which the semiconductor light emitting device, the heatsink, the fan and the guide portion are accommodated. The heatsink includes a base and a plurality of heat dissipating members arranged to protrude from the base.

12 Claims, 4 Drawing Sheets

VEHICLE LAMP

CROSS-REFERENCE TO RELATED APPLICATION

The present application claims priority from Japanese Patent Application No. 2008-111817 filed on Apr. 22, 2008, the entire content of which is incorporated herein by reference.

FIELD OF INVENTION

Apparatuses consistent with the present invention relate to a vehicle lamp having a semiconductor light emitting device as a light source.

DESCRIPTION OF RELATED ART

Related art vehicle lamps have a semiconductor light emitting device, e.g., a light emitting diode (LED), as a light source. In a case of using a semiconductor light emitting device as a light source of a vehicle lamp, efforts are made to use as much light as possible from the semiconductor light emitting device.

Generally, a higher output of the semiconductor light emitting device can be obtained by supplying a larger amount of electric current to the semiconductor light emitting device. However, as the electric current supplied to the semiconductor light emitting device increases, heat generated by the semiconductor light emitting device increases, and if the temperature of the semiconductor light emitting device becomes high due to the heat generation, luminous efficiency of the semiconductor light emitting device decreases. Thus, in order to efficiently dissipate the heat generated by the semiconductor light emitting device, various heat dissipating structures have been proposed (see, e.g., JP 2006-286395 A).

For example, related art vehicle lamps may be configured such that a semiconductor light emitting device, an optical system for irradiating a light emitted from the semiconductor light emitting device toward the outside of the housing, a heatsink for dissipating heat emitted from the semiconductor light emitting device, and a fan for forcibly air-cooling the heatsink are accommodated inside a hermetically-sealed housing.

In this configuration, due to a constraint of installation space inside the housing, it is sometimes difficult to provide a fan that has a sufficient size to send the cooling air directly to the entire heatsink. In such a case, therefore, a portion of the heatsink which sufficiently receives the cooling air from the fan is likely to be restricted to a limited area. That is, some portions of the heatsink may not receive sufficient cooling air, resulting in low heat dissipation efficiency.

SUMMARY OF INVENTION

Illustrative aspects of the present invention provide a vehicle lamp in which a heat generated by a semiconductor light emitting device is efficiently dissipated.

According to an illustrative aspect of the present invention, a vehicle lamp is provided. The vehicle lamp includes semiconductor light emitting device, a heatsink configured to dissipate a heat generated by the semiconductor light emitting device, a fan which moves air, a guide portion configured to diffuse the air from the fan and to guide the air toward the heatsink, and a housing in which the semiconductor light emitting device, the heatsink, the fan and the guide portion are accommodated. The heatsink includes a base and a plurality of heat dissipating members arranged to protrude from the base.

Other aspects and advantages of the invention will be apparent from the following description, the drawings and the claims.

DETAILED DESCRIPTION OF EXEMPLARY EMBODIMENTS OF INVENTION

Hereinafter, vehicle lamps according to exemplary embodiments of the invention are described in detail with reference to the accompanying drawings.

First Exemplary Embodiment

Figure 1:
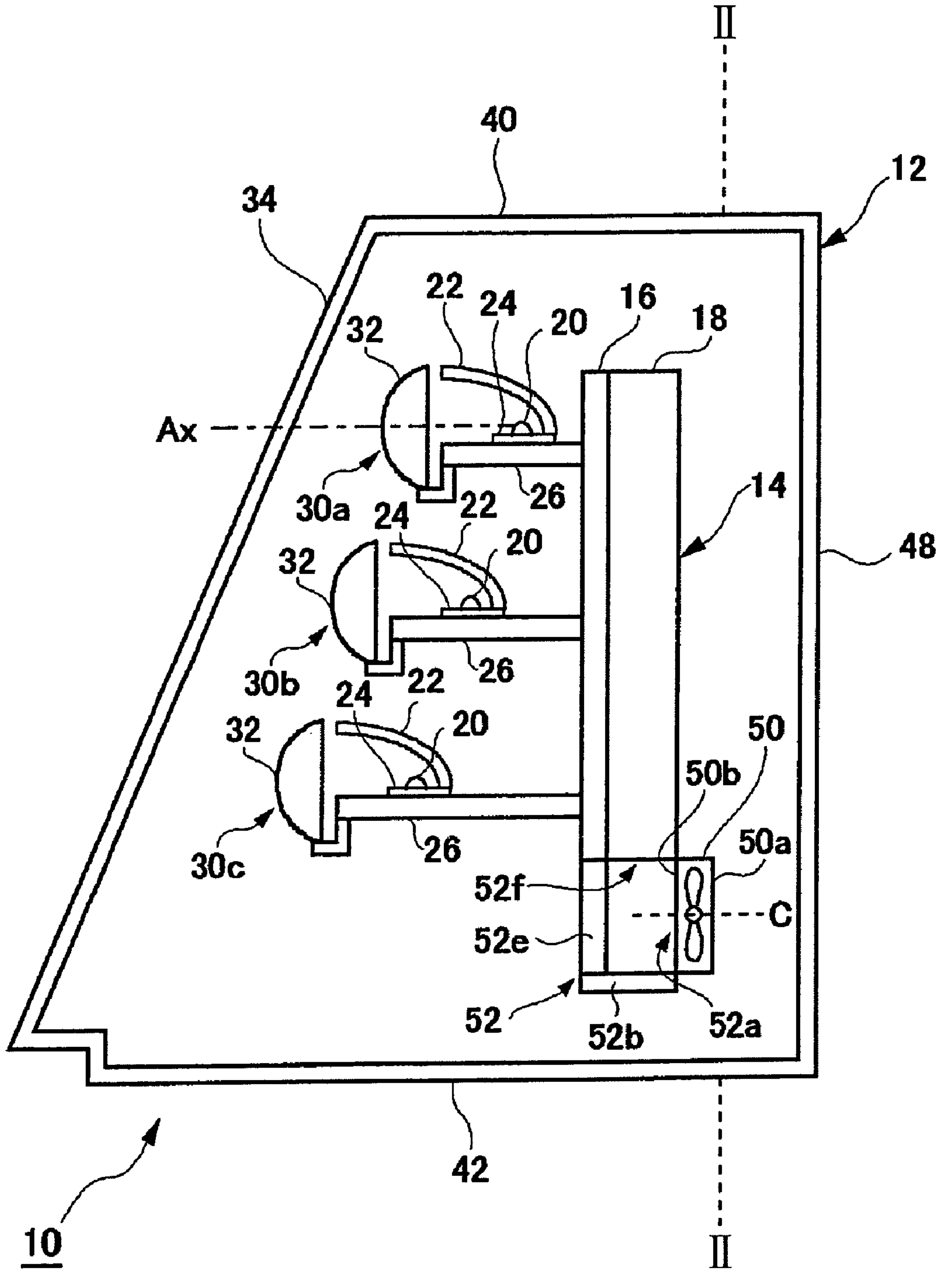
FIG. 1 is a schematic sectional view of a vehicle lamp according to a first exemplary embodiment of the present invention.
Figure 2:
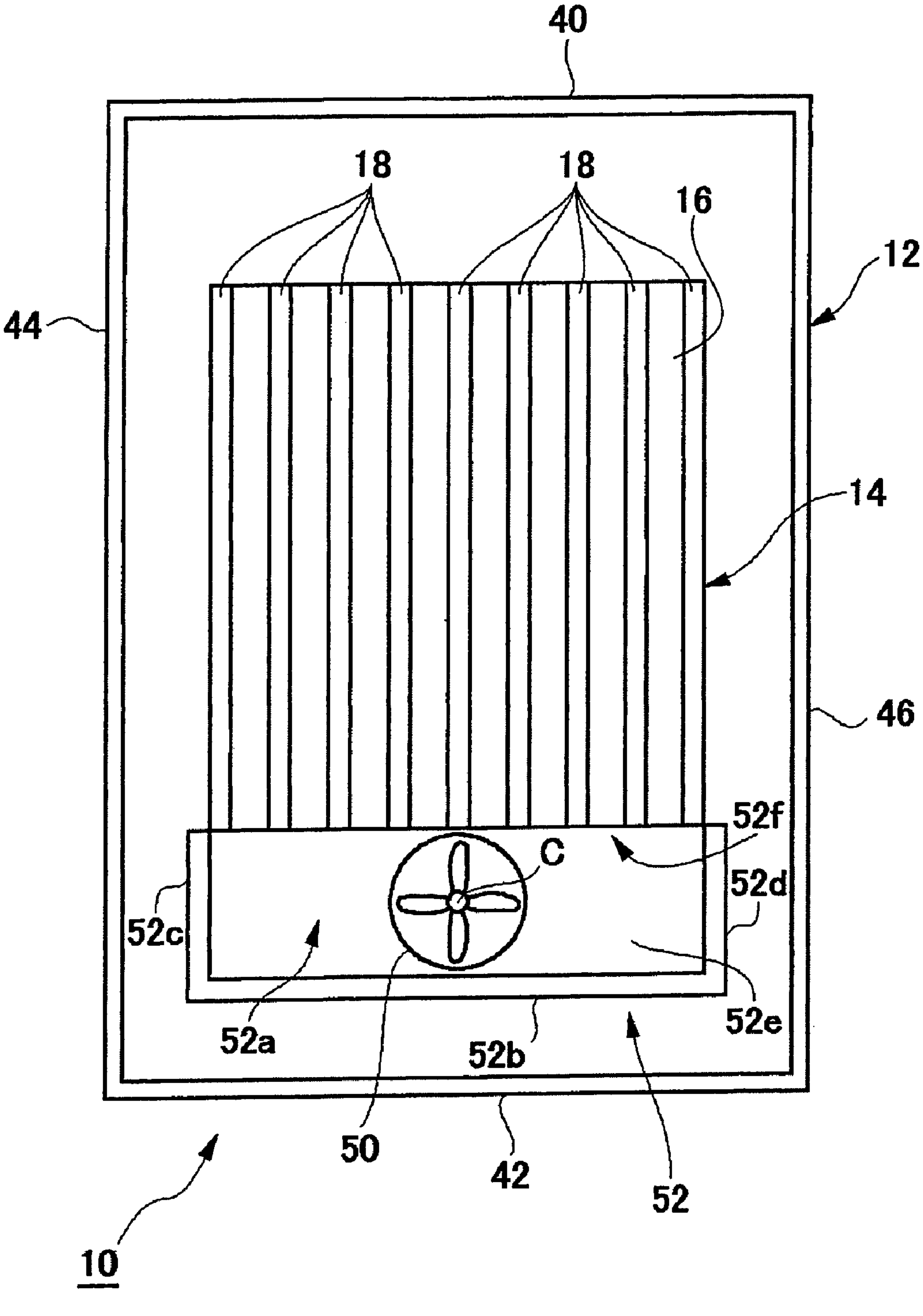
FIG. 2 is a schematic sectional view taken along the line II-II of FIG. 1.

FIG. 1 is a schematic sectional view of a vehicle lamp 10 according to a first exemplary embodiment of the present invention, and FIG. 2 is a schematic sectional view taken along the line II-II of FIG. 1.

As shown in FIG. 1, the vehicle lamp 10 is configured such that a first lamp unit 30*a*, a second lamp unit 30*b*, a third lamp unit 30*c*, a heatsink 14, a fan 50 and a guide portion 52 are accommodated in a housing 12.

As shown in FIGS. 1 and 2, the housing 12 includes six walls, namely, a front wall 34, a rear wall 48, a top wall 40, a bottom wall 42, a left side wall 44 and a right side wall 46. In this exemplary embodiment, the top wall 40 and the bottom wall 42 are arranged to extend horizontally, and the left side wall 44 and right side wall 46 are arranged to be perpendicular to the top wall 40 and the bottom wall 42. Each of the walls of the housing 12 is formed in a shape of a flat plate.

The front wall 34 of the housing 12 is made of transparent resin, e.g., polycarbonate, so as to transmit the light irradiating from each of the lamp units 30. It is advantageous that the housing 12 is hermetically sealed, i.e., have an airtight structure, so that a reduction in light amount level, which may be caused by dust attaching to one or more of the first to third lamp units 30*a*, 30*b*, 30*c*, can be prevented.

The first lamp unit 30*a*, the second lamp unit 30*b*, and the third lamp unit 30*c* are so-called projector type lamp units, and each of the lamp units 20*a*, 20*b*, 20*c* uses an LED as a light source. Hereinafter, the first lamp unit 30*a*, the second lamp unit 30*b*, and the third lamp unit 30*c* will be referred to as lamp units 30 where appropriate.

As shown in FIG. 1, each of the lamp units 30 includes an LED 20, a substrate 24, a reflector 22, a fixing member 26, and a projection lens 32. The LED 20 is, for example, a white LED having an LED chip (not shown) and a hemispherical cap that covers the LED chip. The LED 20 is disposed on the substrate 24 which is formed of thermally conductive and electrically insulative material, e.g., ceramics. The LED 20 is arranged on an optical axis Ax of the corresponding lamp unit 30 such that a light emitting direction of the LED 20 is oriented in a direction perpendicular to the optical axis Ax. An electric power is supplied to the LED 20 via a wiring pattern formed on the substrate 24.

The reflector 22 is formed in a shape of a semidome using, e.g., polycarbonate, and is disposed above the LED 20. An inner surface of the reflector 22 has a reflecting surface which forwardly reflects and converges light emitted from the LED 20 toward the optical axis Ax.

The projection lens 32 is, for example, a planoconvex aspheric lens having a convex front surface and a flat rear surface, and is configured to forwardly project a light source image, which is formed on a rear focal plane, as an inverted image. The fixing member 26 is formed by die casting using an aluminum-based metal so as to be elongated in a plate-like manner. The substrate 24, on which the LED 20 is mounted, and the reflector 22 are fixed onto an upper surface of the fixing member 26. Further, the projection lens 32 is attached to a front end portion of the fixing member 26.

A rear end portion of the fixing member 26 of each of the lamp units 30 is attached to the heatsink 14. The heatsink 14 is formed of high thermal conductive metal such as aluminum, and includes a base 16 and plate fins 18. The plate fins 18 serve as heat dissipating members. The base 16 is a plate-like member having a rectangular shape. The base 16 is arranged such that the long sides of the rectangular shape extend in a vertical direction and such that the short sides of rectangular shape extend in a horizontal direction.

The fixing member 26 of each of the lamp units 30 is fixed to a front surface of the base 16. Further, as shown in FIG. 2, the plate fins 18 are arranged to rearwardly protrude from a rear surface of the base 16 in parallel at certain intervals. The plate fins 18 are arranged, for example, such that a direction in which the plate fins 18 extend in parallel is the vertical direction. In this case, the direction in which the plate fins 18 extend is coincident with a longitudinal direction of each of the plate fins 18.

Each of the lamp units 30 are attached to the heatsink 14 in a manner described above, and the heatsink 14 is attached inside the housing 12 via a support member (not shown) such that the light irradiating from each of the lamp units 30 is forwardly directed through the front wall 34 of the housing 12.

In the vehicle lamp 10, the heatsink 14, to which heat is transmitted from the LEDs 20 of the lamp units 30, is forcibly cooled using a fan. In the related art, a fan which can directly send the air to the entire heatsink 14, e.g., a fan having a diameter that is substantially equal to the short side of the base 16, is used in order to forcibly cool the heatsink 14. However, due to the installation space of the fan inside the housing 12, it is sometimes difficult to arrange a fan of a size sufficient to directly send the air to the entire heatsink 14.

In the vehicle lamp 10, therefore, a guide portion 52 which diffuses the air sent from the fan 50 and guides the air to the heatsink is provided, so that sufficient air can be sent to the entire heatsink 14 using a fan 50 having a small size.

The guide portion 52 is formed in a shape of a rectangular box. The guide portion 52 includes a rear wall 52*a*, a bottom wall 52*b*, a left side wall 52*c*, a right side wall 52*d*, a front wall 52*e*, and an upper opening 52*f*. The rear wall 52*a* is formed, at a central part of the guide portion 52, with a circular opening through which the air is introduced into the guide portion 52. The bottom wall 52*b*, the left side wall 52*c*, the right side wall 52*d* and the front wall 52*e* block the air flow. The upper opening 52*f* allows the air to be sent to the heatsink 14. It is advantageous that a diameter of the circular opening in the rear wall 52*a* be substantially equal to or slightly larger than the diameter of the fan 50. Each of the rear wall 52*a* and the front wall 52*e* is formed in a rectangular shape having a long side which is substantially equal in length to the short side of the base 16 and a short side which is substantially equal in length to the diameter of the fan 50. The bottom wall 52*b* is formed in a rectangular shape having a long side which is substantially equal in length to the short side of the base 16 and a short side which is substantially equal in length to the short side of each of the plate fins 18. Each of the left side wall 52*c* and the right side wall 52*d* is formed in a rectangular shape having a long side which is substantially equal in length to the diameter of the fan 50 and a short side which is substantially equal in length to the short side of each of the plate fins 18. The upper opening 52*f* is formed in a rectangular shape having a long side which is substantially equal in length to the short side of the base 16 and a short side which is substantially equal in length to the short side of each of the plate fins 18. That is, the short sides of bottom wall 52*b*, the left side wall 52*c*, the right side wall 52*d* and upper opening 52*f* are substantially equal in length to the protruding amount of a bottom end of each of the plate fins 18 from the base 16. The guide portion 52 is configured such that a bottom end face of each of the plate fins 18 faces the upper opening 52*f*, and such that an inner wall surface of the front wall 52*e* is substantially flush with the rear surface of the base 16. Thus, the inner space of the guide portion 52 communicates with gaps between the adjacent plate fins 18 via the upper opening 52*f*.

The fan 50 may be an axial flow fan, such as a propeller fan, which takes in the air in an axial direction of the fan 50 and sends out the air in the axial direction of the fan 50. The fan 50 has an inlet port 50*a* from which air is taken in and an outlet port 50*b* from which the air is sent into the guide portion 52. The diameter of the fan 50 may be, for example, substantially equal to one-third of the length of the short side of the base 16.

The fan 50 is arranged such that the air enters into the guide portion 52 from the opening of the rear wall 52*a* and perpendicularly collides with a central portion of the inner wall surface of the front wall 52*e*. More specifically, the outlet port 50*b* faces the opening of the rear wall 52*a* of the guide portion 52, and the axis C of the fan 50 perpendicularly intersects with the center of the front wall 52*e* of the guide portion 52.

Figure 3:
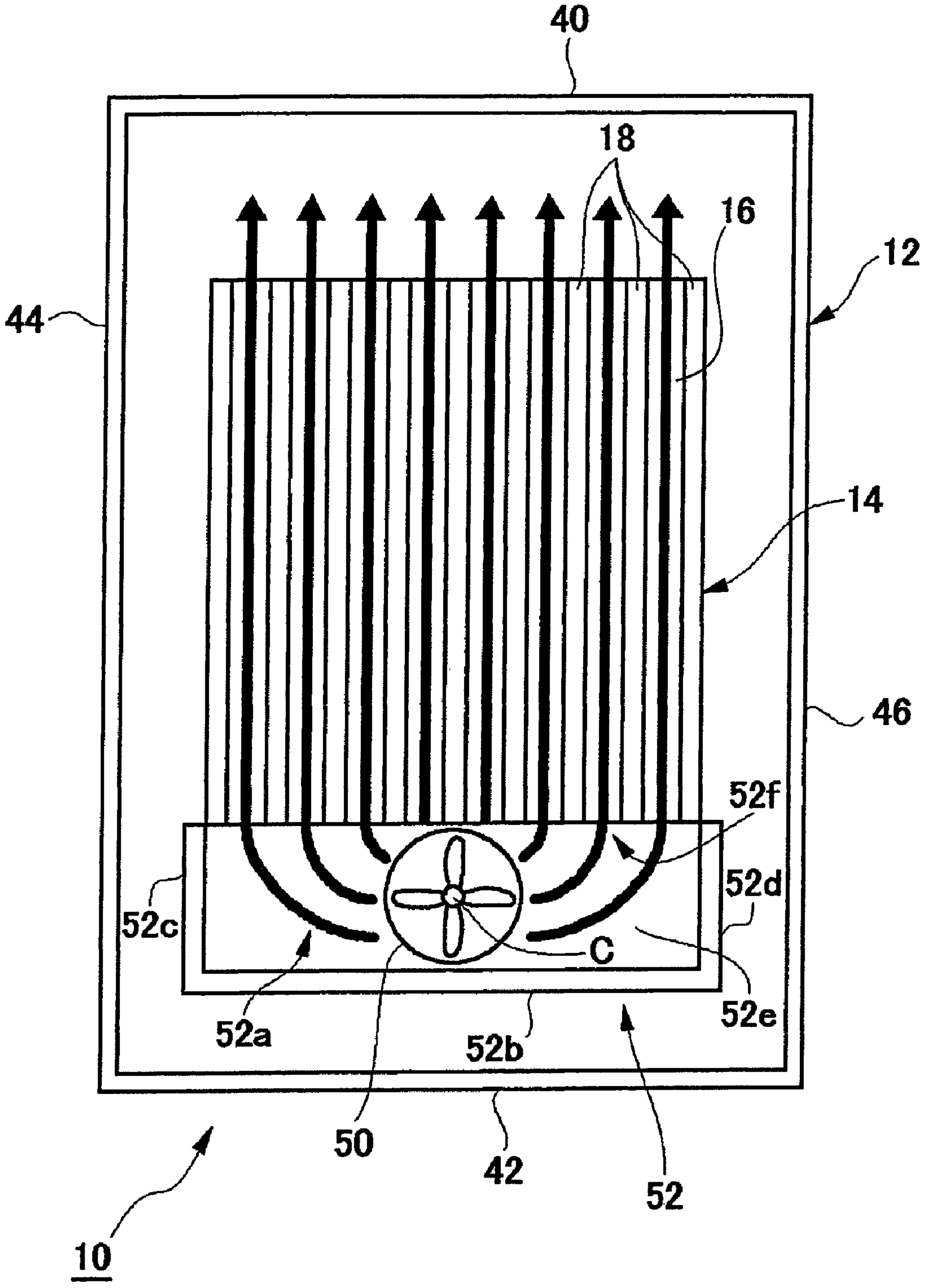
FIG. 3 is an explanatory view a flow of air inside the vehicle lamp according to the first exemplary embodiment.

FIG. 3 is an explanatory view illustrating the air flow in the vehicle lamp 10 according to the first exemplary embodiment. In FIG. 3, thick arrows represent air flows, respectively. When the LED 20 emits light in the vehicle lamp 10, the heat generated by the light emission is transmitted to the fixing member 26 via the substrate 24 with which the LED 20 is in contact. The heat transmitted to the fixing member 26 is further transmitted to the base 16 of the heatsink 14, which is in contact with the rear end portion of the fixing member 26. The substrate 24 and the fixing member 26 function as a thermally conducting portion which transmits the heat generated by the LED 20 to the heatsink 14. The heat transmitted to the base 16 of the heatsink 14 is transmitted to the plate fins 18. Then, the heat is dissipated from the plate fins 18 to the surrounding air through heat exchange between the surrounding air and the plate fins 18.

When the fan 50 is rotated, the air is taken in from the inlet port 50*a* and is sent out from the outlet port 50*b*. The air sent out from the outlet port 50*b* enters into the guide portion 52 from the opening of the rear wall 52*a*. Then, the air collides with the central portion of the inner wall surface of the front wall 52*e* perpendicularly, and is radially diffused from the central portion of the front wall 52*e*. The flow of the air is blocked by a part of the rear wall 52*a* other than the opening, the bottom wall 52*b*, the left side wall 52*c*, and the right side wall 52*d*, so that the air flows in the direction toward the upper opening 52*f* Accordingly, the air from the fan 50 is diffused and is uniformly sent into all the gaps between the adjacent plate fins 18 of the heatsink 14. Consequently, although the diameter of the fan 50 is about one-third of the length of the short side of the base 16 of the heatsink 14, the fan 50 can forcibly cool the entire heatsink 14. As a result, the heat generated from the LEDs 20 can efficiently be dissipated.

In addition, because the heat dissipation efficiency is enhanced, the number of the plate fins 18 can be reduced. Consequently, the weight of the vehicle lamp 10 can be reduced.

It is advantageous that the guide portion 52 be provided at the bottom of the heatsink 14 to guide the cooling air from the bottom of the heatsink 14 to the gaps between the adjacent plate fins 18. According to this configuration, the direction of natural convection caused by the heat dissipated from the heatsink 14 matches the direction of air sent from the fan 50, so that the heat dissipation efficiency can be further enhanced.

While the rear wall 52*a* of the guide portion 52 is partially opened in the exemplary embodiment described above, alternatively the entire rear side of the guide portion 52 may be opened to introduce the air sent from the fan 50 into the guide portion 52.

It is advantageous that the guide portion 52 and the heatsink 14 are integrally formed together in a one-piece structure. For example, the heatsink 14 and the guide portion 52 may be integrally formed through aluminum die casting. According to this configuration, the assembling of the vehicle lamp 10 can be facilitated. In addition, the cost of the vehicle lamp 10 can be decreased because the number of components is reduced. However, alternatively, the guide portion 52 and the heatsink 14 may be provided as separate structures.

In the exemplary embodiment described above, the air is sent from the fan 50 in a direction perpendicular to a vertical direction in which the fin plates 18 extend along the base 16, the front wall 52*e* of the guide portion 52 is provided to face against the direction in which air is sent, and the air colliding with the front wall 52*e* is diffused and is introduced into the gaps between the adjacent fin plates 18. However, the arrangement of the fan 50, the guide portion 52 and the heatsink 14 is not limited to the arrangement in the exemplary embodiment described above. For example, the fan 50, the guide portion 52 and the heatsink 14 may be arranged in any other way so as to send the air from the fan 50 in a first direction that is different from a second direction in which the fin plates 18 extend along the base 16, to provide the guide portion 52 to place a wall surface facing against the first direction, so that the air colliding with the wall surface is diffused and is guided into the gaps between the adjacent plate fins.

Second Exemplary Embodiment

Figure 4:
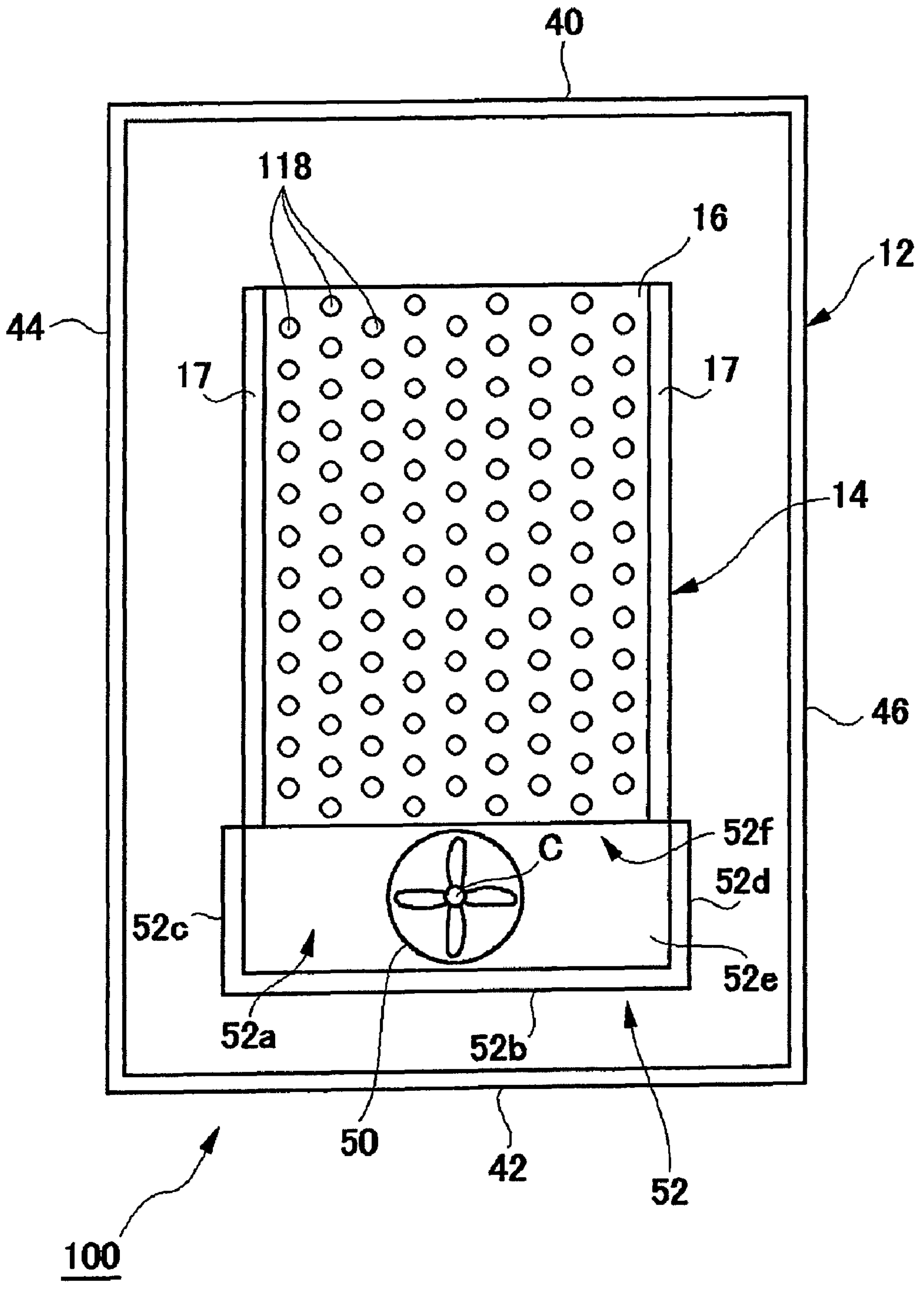
FIG. 4 is an explanatory view of a vehicle lamp according to a second exemplary embodiment of the present invention.

FIG. 4 is a schematic sectional view of a vehicle lamp 100 according to a second exemplary embodiment of the present invention. In FIG. 4, thick arrows represent air flows, respectively. Components which are the same or corresponding to those of the vehicle lamp 10 according to the first exemplary embodiment are designated with the reference numerals, and repetitive description of thereof will be omitted.

The vehicle lamp 100 differs from the vehicle lamp 10 of the first exemplary embodiment in that a plurality of pin fins 118 are arranged to rearwardly protrude from the base 16. The pin fins 118 are arranged in a certain pattern, and serve as heat dissipating members. In addition, plate fins 17 are arranged to rearwardly protrude from respective sides of the base 16. The plate fins 17 extend along the respective sides of the base 16 from the bottom end to the top end of the base 16 so as to guide the air sent from the guide portion 52 to the pin fins 118 on the upper side. The plate fins 17 may also function as heat dissipating members, i.e., as a part of the heatsink 14 to dissipate the heat transmitted from the LEDs 20. The configuration and arrangement of the guide portion 52 and the fan 50 are the same as the first exemplary embodiment.

As was the case in the first exemplary embodiment, the guide portion 52 diffuses the air sent from the fan 50 and guides the air toward the heatsink 14. Thus, the air from the fan 50 can be uniformly sent to all the gaps between the adjacent pin fins 118 of the heatsink 14. Consequently, although the diameter of the fan 50 is only one-third of the length of the short side of the base 16, the fan 50 can forcibly cool the entire heatsink 14. Accordingly, the heat generated by the LED 20 can efficiently be dissipated.

While the present invention has been shown and described with reference to certain exemplary embodiments thereof, it will be understood by those skilled in the art that various changes in form and details may be made therein without departing from the spirit and scope of the invention as defined by the appended claims.

For example, while the LED is used as the light source of each of the lamp units 30 in the exemplary embodiments described above, other types of semiconductor light emitting device, e.g., a semiconductor laser may be used as a light source of one or more of the lamp units 30.

Further, while the lamp units 30 are the projector type lamp units in the exemplary embodiments described above, one or more paraboloidal reflector type lamp units and/or a non-reflector type may be alternatively or additionally used.

Furthermore, while the number of lamp units 30 is three in the exemplary embodiments described above, the number of lamp units may not be three, and may be one, two or more than three.

Accordingly, these and other changes and modifications are included within the scope of the invention as defined by the appended claims.

What is claimed is:

1. A vehicle lamp comprising;

a semiconductor light emitting device;

a heatsink configured to dissipate heat generated by the semiconductor light emitting device, wherein the heatsink comprises a base and a plurality of heat dissipating members arranged to protrude from the base;

a fan which moves air;

a guide portion configured to diffuse the air from the fan and to guide the air toward the heatsink; and a housing in which the semiconductor light emitting device, the heatsink, the fan and the guide portion are accommodated;

wherein the heat dissipating members form a plurality of gaps therebetween, and the guide portion is arranged below the heatsink to upwardly guide the air into the respective gaps, wherein the guide portion comprises:

a rear wall formed with an opening through which the air is introduced in the guide portion from the fan;

a front wall facing the rear wall;

two sides walls; and a bottom wall from which the rear wall, the front wall and the side walls upwardly extend, wherein an upper opening is formed above the bottom wall to send the air toward the heatsink.

2. The vehicle lamp according to claim 1, wherein the fan is configured and arranged to move the air in a first direction which is different from a second direction in which the plurality of heat dissipating members extend longitudinally along the base, and the guide portion comprises a wall surface which is disposed in front of the fan in the first direction such that the air colliding with the wall surface is diffused and is guided toward the heatsink.

3. The vehicle lamp according to claim 1, wherein the fan is arranged to face the opening in the rear wall of the guide portion.

4. The vehicle lamp according to claim 1, wherein the base comprises a rear surface from which the plurality of heat dissipating members rearwardly protrude, and an inner wall surface of the front wall of the guide portion is flush with the rear surface of the base.

5. The vehicle lamp according to claim 4, wherein the plurality of heat dissipating members comprises a plurality of plate fins which rearwardly protrude from the base at intervals.

6. The vehicle lamp according to claim 4, wherein the plurality of heat dissipating members comprises a plurality of pin fins which rearwardly protrude from the base at intervals.

7. The vehicle lamp according to claim 4, wherein the plurality of heat dissipating members comprises two plate fins that are arranged to rearwardly protrude from respective sides of the base.

8. The vehicle lamp according to claim 4, wherein the base is rectangular, and a diameter of the fan is smaller than a short side of the base.

9. The vehicle lamp according to claim 4, wherein the housing is hermetically sealed.

10. The vehicle lamp according to claim 4, wherein the heatsink and the guide portion are integrally formed together in a one-piece structure.

11. A vehicle lamp comprising:

a hermetically sealed housing;

a semiconductor light emitting device;

a heatsink comprising a base to which the semiconductor light emitting device is thermally connected, and a plurality of heat dissipating members thermally connected to the base, arranged to protrude from the base, and distributed at intervals along the base so as to form a plurality of gaps between the heat dissipating members;

a fan which moves air; and a means for uniformly distributing the air from the fan into the plurality of gaps to dissipate the heat from the heatsink wherein the semiconductor light emitting device, the heatsink, the fan and said means are accommodated inside the hermetically sealed housing;

wherein the means for uniformly distributing the air is arranged below the heatsink to upwardly guide the air into the respective gaps, wherein the means for uniformly distributing the air comprises a rear wall formed with an opening through which the air is introduced in the guide the means for uniformly distributing the air from the fan;

a front wall facing the rear wall;

two side walls; and a bottom wall from which the rear wall, the front wall and the side walls upwardly extend, wherein an upper opening is formed above the bottom wall to send the air toward the heatsink.

12. The vehicle lamp according to claim 11, wherein the base comprises a rear surface from which the plurality of heat dissipating members rearwardly protrude, and an inner wall surface of the front wall is flush with the rear surface of the base.

* * * * *